United States Patent
Ferrant et al.

(10) Patent No.: US 7,809,174 B2
(45) Date of Patent: Oct. 5, 2010

(54) METHOD AND SYSTEM FOR SEGMENTATION OF COMPUTED TOMOGRAPHY IMAGE DATA

(75) Inventors: Matthieu Denis Ferrant, Saint Rémy lès Chevreuse (FR); Claire Naslot, Villepreux (FR); Saad Ahmed Sirohey, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 1071 days.

(21) Appl. No.: 11/085,736

(22) Filed: Mar. 21, 2005

(65) Prior Publication Data

US 2006/0239522 A1    Oct. 26, 2006

(51) Int. Cl.
*G06K 9/00* (2006.01)
(52) U.S. Cl. ...................................... 382/128
(58) Field of Classification Search ......... 382/128–132; 600/407, 408, 409, 410, 411, 412, 413, 414, 600/415, 416, 417; 128/922
See application file for complete search history.

(56) References Cited

U.S. PATENT DOCUMENTS

| | | | | |
|---|---|---|---|---|
| 5,757,953 A | * | 5/1998 | Jang | 382/132 |
| 2002/0009215 A1 | * | 1/2002 | Armato et al. | 382/131 |
| 2003/0099385 A1 | * | 5/2003 | Zeng et al. | 382/128 |
| 2003/0167001 A1 | | 9/2003 | Allain et al. | |
| 2005/0196024 A1 | * | 9/2005 | Kuhnigk | 382/128 |

OTHER PUBLICATIONS

Hu, S. et al. "Automatic Lung Segmentation for accurate Quantitation of Volumetric X-ray CT Images", IEEE Transactions on Medical Imaging, 2001, 20(6): 490-498.
Kiraly, A.P. et al. "Three Dimensional Human Airway Segmentation Methods for Clinical Virtual Bronchoscopy", Academic Radiology, 2002, 9(10): 1153-1168.

* cited by examiner

*Primary Examiner*—Samir A. Ahmed
*Assistant Examiner*—Atiba O Fitzpatrick
(74) *Attorney, Agent, or Firm*—Armstrong Teasdale LLP (57) ABSTRACT

Methods and systems for processing image data are described. One method includes identifying image data corresponding to an imaged trachea and identifying image data corresponding to imaged lungs. The method further includes separating the image data corresponding to the imaged trachea from the imaged data corresponding to the imaged lungs.

9 Claims, 9 Drawing Sheets

METHOD AND SYSTEM FOR SEGMENTATION OF COMPUTED TOMOGRAPHY IMAGE DATA

BACKGROUND OF THE INVENTION

The invention relates generally to medical imaging systems, and more particularly, to Computed Tomography (CT) systems.

Lung Cancer is a leading cause of cancer related mortality in the United States. Many references in the literature point to a need for better patient management to provide earlier detection. Early detection is also important for reducing mortalities for other lung diseases, such as Chronic Obstructive Pulmonary Diseases (COPD). Conventional techniques to detect cancer include use of medical imaging systems such as X-ray, CT scan, and the like. CT imaging provides an image of anatomy in detail and is therefore being increasingly used for detecting and following the evolution of, for example, lesions that may be potential cancers, as well as other diseases.

In the case of CT image data, lung segmentation allows focusing on the lung area only and is an important preprocessing step. Several methods are used to analyze the segmented lung area in order to detect abnormalities. One of the methods used is Advanced Lung Analysis (ALA). Radiologists use ALA to search for nodules in the segmented lungs. The ALA method typically includes a digital contrast agent (DCA) algorithm, which is directly applied on the lung Region of Interest (ROI) scan data. The sensitivity and specificity of the DCA algorithm is directly linked to the performance of the lung segmentation algorithm.

For Chronic Obstructive Pulmonary Diseases (COPD), lung and trachea segmentation are processes without which assessment of the disease is very difficult, if not impossible. For example, for automatic emphysema quantification, lung segmentation is used to focus on the parenchyma only. Lung segmentation allows for an automated emphysema quantification metric, and for its follow-up over time, as well as having density histograms that incorporate the lung area only. Lung segmentation can then be performed for both lungs, or for each lung or lobe separately. As another example, for automated virtual bronchoscopy, automated trachea data extraction provides a fully automated tool to initiate a tubular tracking in the bronchi, and which may be performed using techniques similar to those of General Electric's Advanced Vessel Analysis software.

For Radiotherapy planning, performed physicians need to be able to delineate the lungs very accurately to efficiently position the radiotherapy beams with a separate delineation so as to minimize, for example, radiation exposure and possible collateral damage to other organs. Moreover, if the CT scan is a full body image scan, it becomes difficult for the physicians to exactly pinpoint and delineate the lungs. Also, to perform analysis over a particular growth of a nodule over a time typically requires segmentation to the level of internal structures of the lungs.

BRIEF DESCRIPTION OF THE INVENTION

In one exemplary embodiment, a method for processing image data is provided. The method includes identifying image data corresponding to an imaged trachea. The method further includes identifying image data corresponding to image lungs and separating the image data corresponding to the imaged trachea from the imaged data corresponding to the imaged lungs.

In another exemplary embodiment, an imaging system is provided. The imaging system includes an image acquisition component for acquiring image data of a human. The imaging system also includes an image processing component configured to process the acquired image data to generate an image based on the acquire image data. The image processing component is further configured to identify acquired image data corresponding to an imaged trachea and also identify acquired image data corresponding to imaged lungs. The image processing component is further configured to segment the image data corresponding to the imaged trachea from the image data corresponding to the imaged lungs.

DETAILED DESCRIPTION OF THE INVENTION

Various embodiments of the present invention provide a method and system to automatically segment trachea and lung data from Computerized Tomography (CT) image data.

Figure 1:
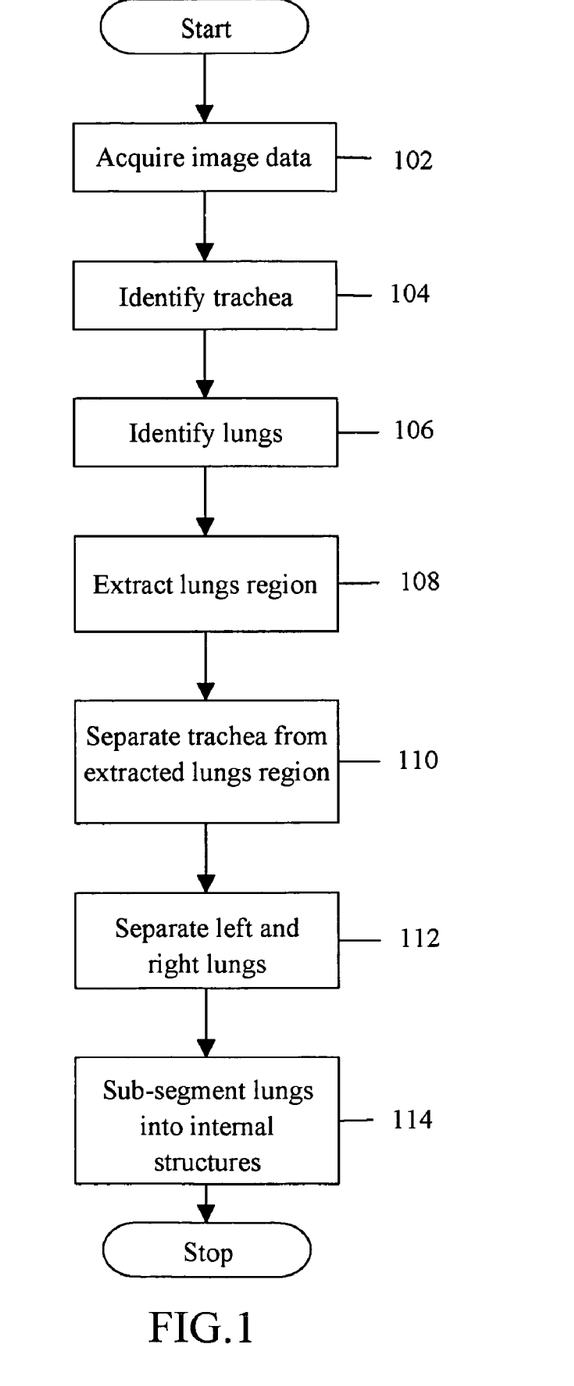
FIG. 1 is a flowchart illustrating a method of processing Computed Tomography (CT) image data in accordance with an embodiment of the present invention.

FIG. 1 is a flowchart illustrating generally a method of processing CT image data in accordance with various embodiments of the present invention. At 102, CT image data is acquired. At 104, trachea data is identified from the image data. At 106, lung data is identified from the image data. Lung region extraction is then performed at 108. The identified trachea is separated from the identified lungs at 110. Further, separate trachea and lung image data may be provided. From the separated lung data, left and the right lung data is segmented at 112. Further, the segmented lung data may be sub-segmented into internal structures at 114. Each of these steps will now be described in more detail.

Specifically, at 102, CT image data is acquired. For example, a person (e.g., patient) is scanned using a CT scanner to obtain scanned image data of the person. CT imaging provides image data of the anatomy of the scanned person. The CT scan data may be analyzed to identify diseases or medical ailments. Various embodiments of the present invention may be implemented in connection with any type of CT acquisitions containing all or part of the lungs, for example, full body acquisitions, lung acquisitions, and targeted acquisitions. An exemplary embodiment of the present invention provides a method to separate trachea image data from left and right lung image data in order to improve the effect of morphological processing on each of these volumes separately.

At 104, trachea data is identified from the image data. Identification of trachea data from the image data is based on a-priori anatomical information relating to the trachea (e.g., previously processed image data). Because the trachea is always filled with air, sections of the trachea are circular and the trachea is located in the middle of the image. The a-priori anatomical information is used to identify trachea image data from the CT image data. Identification of trachea data is followed by separation of trachea data from the CT image data. Further, the a-priori anatomical information is used to determine a threshold for segmentation operation. The threshold values in an exemplary embodiment correspond to the mean parameters obtained from the a-priori anatomical information, for example, anatomical size information, geometrical relationship information, range information, shape information, volume information, density information, scan acquisition parameters, and the like.

It should be noted that when reference is made herein to a particular type or kind of data, for example, trachea data, this refers to acquired image data corresponding to an imaged trachea.

At 106, lung data is identified from the CT image data. Identification of lung data is also based on a-priori anatomical information. The a-priori anatomical information includes information relating to the character of the lungs, and more particularly, that the lungs correspond to the largest air component inside the body. The a-priori anatomical information is used to identify lung imaged data from the image data. Further, the a-priori anatomical information may be used to determine a threshold for lung region segmentation operation. The threshold values correspond to mean parameters obtained from the a-priori anatomical information, for example, anatomical size information, geometrical relationship information, range information, shape information, volume information, density information, scan acquisition parameters, and the like.

Lung region data extraction is performed at 108. This data extraction process results in a threshold volume containing lung data, trachea data and minimized non-lung components. Data corresponding to the outside air and portion of the colon are removed from the original threshold volume. The first sub-step is to remove data corresponding to outside air and table air in order to extract body volume data. Outside and table air data is removed using a threshold, for example, a density threshold having a high density value (e.g., >=−530 Hounsfield Units (HU)). Further, morphological operations may be performed in order to remove air data corresponding to the table. Additionally, a two-dimensional holes filling process is performed followed by removing data with a threshold having low density value (e.g., <=−480 HU) to include lung voxels. Lung region data extraction is pictorially illustrated in connection with FIG. 5.

Identified trachea data is separated from identified lung data at 110. The trachea data extraction can be performed on any input volume, but the computation is typically faster if the input is the output volume of the lung region data extraction. This process is performed based on a-priori anatomical information, and in particular, information that the trachea density is lower than the lung mean density. Identifying trachea data begins with establishing a threshold having a very low density value (e.g., <=−930 HU). As a result, the trachea voxels are disconnected from the lung voxels. Additionally, because the trachea is in the middle of the image, a cylindrical mask of the volume of the trachea is computed to eliminate objects outside of a central cylinder in the image.

From the a-priori anatomical information, a two dimensional area of trachea may be defined as being within the range of, for example, 80-400 mm². This area corresponds to average values of a trachea section area plus a hysterisis factor, which defines a working volume. Based on this information, data corresponding only to two-dimensional components in the range of 80-400 mm² is saved. Further, the most circular component of the working volume is searched based on a circularity definition: $(4*\pi*[\{Perimeter\}^2/Area]) \approx 1$. Additionally, a three-dimensional component corresponding to the most circular two-dimensional component is selected. The selected component is analyzed for height, orientation and volume, and if the parameters do not match with the a-priori anatomical information, the component is removed (e.g., data corresponding the component is deleted) and the process is repeated until a component that matches the a-priori anatomical information is located. The process of trachea data extraction is explained in more detail in connection with FIG. 2.

Once the trachea data is separated from the lung region data at 110, the lung data is separated from the extracted lung region to obtain data corresponding to each lung. From the separated lung data, left and right lung data is segmented at 112. The segmentation is performed in two sub-steps. In the first sub-step, lung data splitting is performed and in the next sub-step classification of the lung data is performed. Trachea data removal, in some instances, is not enough to separate the lung data because the lung is connected through a very thin boundary of slightly brighter voxels with partial voluming at the level of the sternum. The step of lung data splitting and classification is further described in connection with FIG. 6.

The next sub-step of segmentation of the lung data is performed on a threshold volume containing data corresponding to both lungs. In an embodiment of the present invention, the segmentation is performed in order to segment lung data into left lung data and right lung data. A-priori anatomical information is used to segment the lung data. This a-priori anatomical information may be, for example, for an average lung size. After segmentation is performed, the initial lung volume data results in data corresponding to two volumes containing the right and left lung. In an embodiment of the present invention, the operation is performed on data corresponding to a lung volume including the trachea. In another embodiment of the present invention, the operation is performed on data corresponding to a lung volume that does not include the trachea.

The classification or the segmentation of lung data is based on the a-priori anatomical information relating to the lung data. In an embodiment of the present invention, the segmentation of the lung data is based on the a-priori anatomical information relating to average size of the lungs expressed in terms of a feature vector. The feature vector may be defined and may include parameters related to the average size of the lungs, for example, in a two-dimensional component, maximum width, maximum height, and coordinates of the center of gravity. There may be three a-priori models such as, for example, right lung, left lung, and both lungs.

Each component of the threshold volume defines a vector comprising parameters such as width, height, area, coordinates of the center of gravity, and the like. The classification is provided by comparing the vector of the component with the feature vectors of the three a-priori models. For example, the feature vector of the three a-priori models can be defined as:

X=(Xsize, Ysize, Xcog, Ycog)

where "X" represents an exemplary feature vector, Xsize represents a width of a component, Ysize represents a height of the component, Xcog represents an X coordinate of the center of gravity of the component, and Ycog represents the Y coordinate of the center of gravity of the component.

The three a-priori models are defined by the feature vectors, for example:

RLUNG=(100, 150, Xm−50, Ym), represents the right lung feature vector.

LLUNG=(100, 150, Xm+50, Ym), represents the left lung feature vector.

LUNGS=(200, 150, Xm, Ym) represents the both lungs feature vector.

Where, Xm and Ym are the coordinates of the middle of the image.

At 114, each of the segmented lung data sets is sub-segmented into internal structure data sets. This process includes morphological processing on both parenchyma volumes and their complementary. An embodiment of the present invention provides a method to identify protrusions with minimal boundary degradation. The morphological processing is explained further in connection with FIG. 8.

In an embodiment of the present invention, data corresponding to the ribs or spine can be included in the final lung volume, which contribute artifacts for visualization and further processing. In some cases the lungs are molded against the ribs, which may be displayed as protrusions inside the lung parenchyma. The bone component data is removed by using a threshold having a high density value, followed by selecting the largest connected component and performing a simple closing operation. The bone structure data can then be subtracted from the lung volume data. Segmentation of a lung with and without bone data removed is further explained in connection with FIG. 7. Exemplary images of lung segmentation are further explained in connection with FIG. 9.

Figure 2:
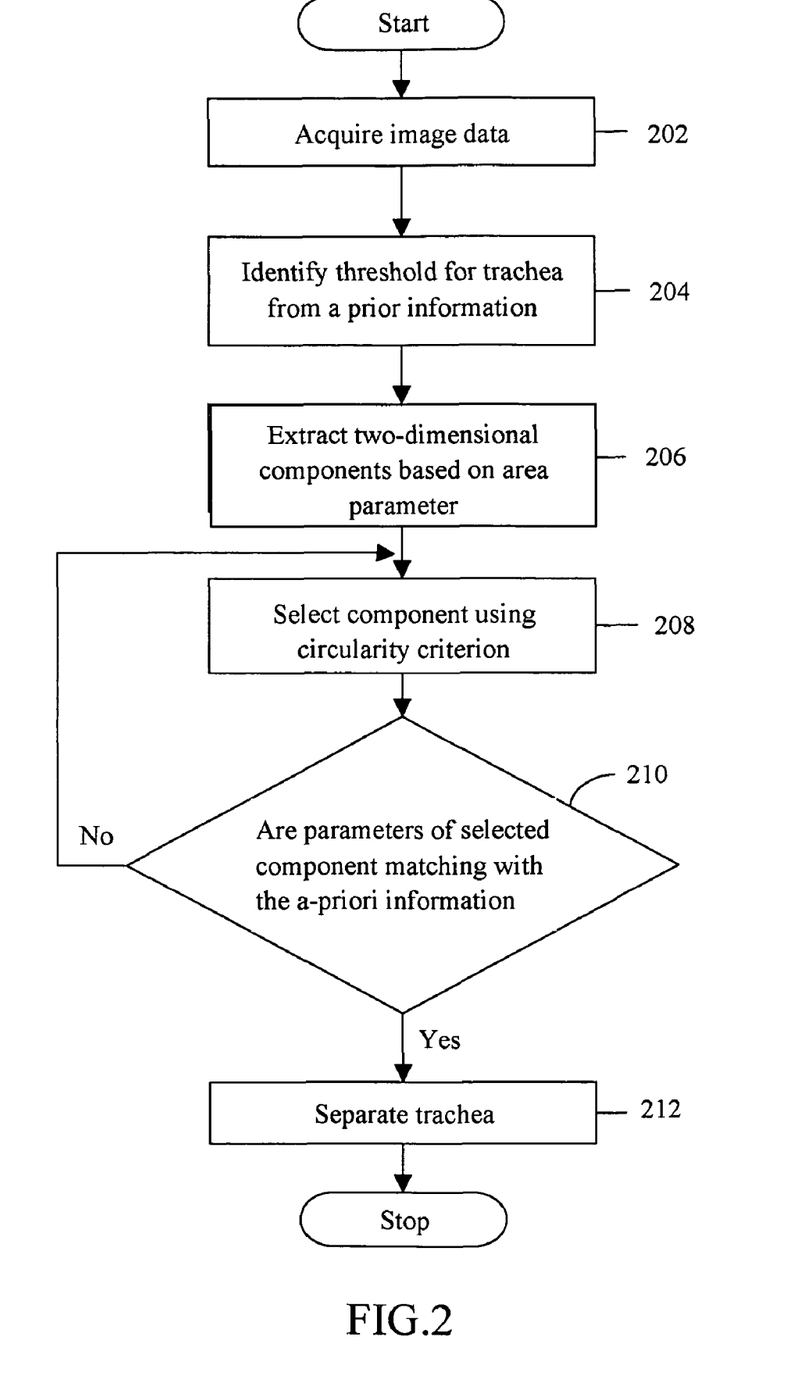
FIG. 2 is a flowchart illustrating a method of segmenting trachea data from imaged data in accordance with an embodiment of the present invention.

FIG. 2 is a flowchart illustrating a method of segmenting trachea data from acquired imaged data in accordance with an embodiment of the present invention. At 202, image data is acquired. At 204, a threshold for trachea data is identified (e.g., defined) from a-priori anatomical information. Additionally, mean parameters with respect to the trachea such as height, area, and the like, are identified for the trachea from the a-priori anatomical information. At 206, two-dimensional component data is extracted based on an area parameter. At 208, a component is selected using circularity criteria as explained above. At 210, parameters of the selected components are compared with the mean parameters obtained from the a-priori anatomical information. If the parameters of the selected components correspond to those of the a-priori anatomical information, then the mean parameters obtained from the a-priori anatomical information data corresponding to the selected component is extracted at 212. If the parameters of the selected component do not match with the mean parameters obtained from a-priori anatomical information, then steps 208 and 210 are repeated. An example of a segmented trachea is provided in FIG. 9.

Figure 3:
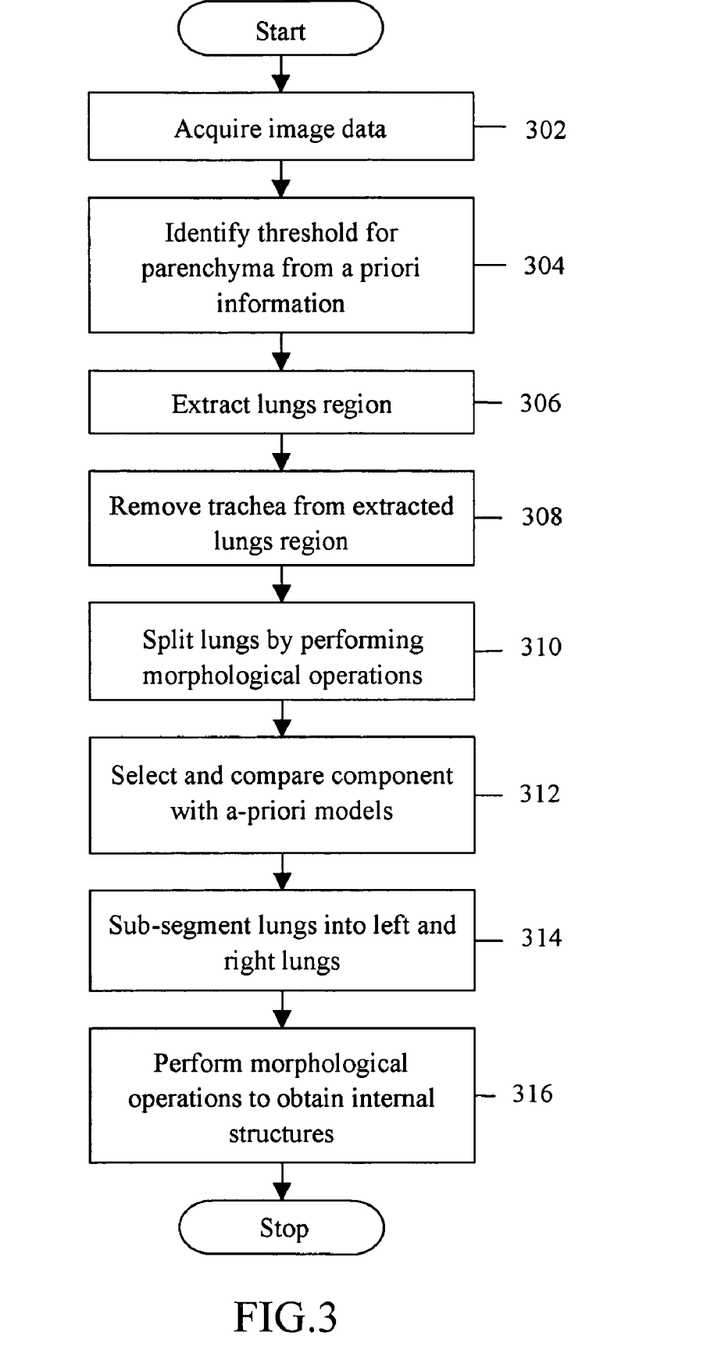
FIG. 3 is a flowchart illustrating a method of segmenting lung data in accordance with an embodiment of the present invention.

FIG. 3 is a flowchart illustrating a method of segmenting lung data from imaged data in accordance with an embodiment of the present invention. At 302, image data is acquired. At 304, a threshold value for parenchyma data is identified from the a-priori anatomical information. Additionally, mean parameters with respect to lungs, such as average size of the lungs, are obtained from the a-priori anatomical information. At 306, lung region data is extracted. At 308, trachea data is separated from the lung data. At 310, lung data splitting is performed by morphological operations. The process of lung splitting is further explained in connection with FIG. 6. At 312, a component obtained from splitting is selected and is compared with the mean parameters obtained from the a-priori anatomical information in order to classify the lung data into right and left lung data. At 314, lung data is sub-segmented into left and right lung data. The sub-segmented lung data is then further segmented to obtain internal structure data of the lungs by performing morphological operation at 316. The morphological operations to obtain the internal structure data of the lungs are explained in connection with FIG. 8.

Figure 4:
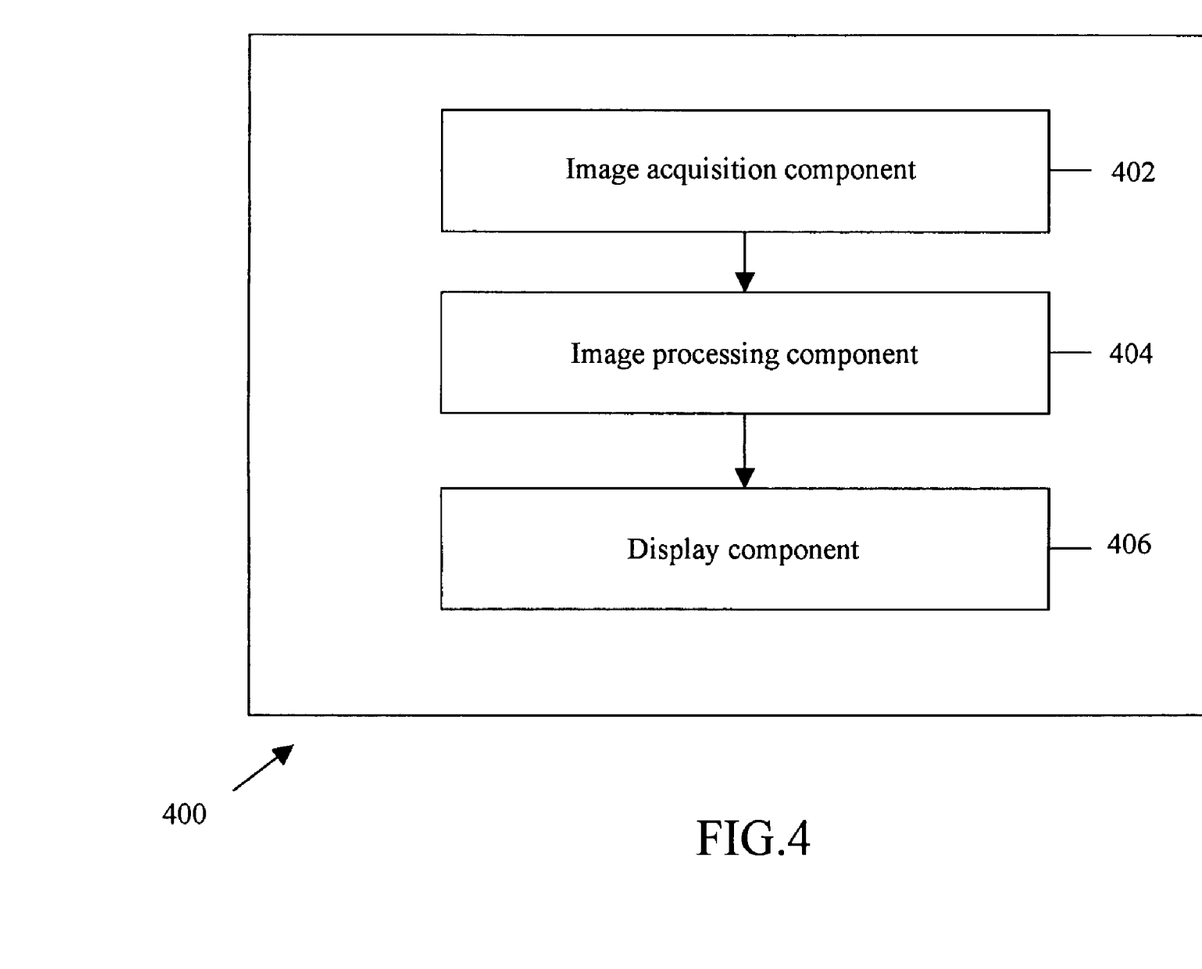
FIG. 4 is a block diagram of a system for processing CT image data in accordance with an embodiment of the present invention.

FIG. 4 is a block diagram of a system for processing CT image data in accordance with an embodiment of the present invention (e.g., CT scanner system). System 400 includes an image acquisition component 402, an image processing component 404, and a display component 406. Image acquisition component 402 acquires image data, for example using an x-ray source and detector mounted to a gantry as is known. In an embodiment of the present invention, image processing component 404 performs the steps for segmenting trachea data from image data. In another embodiment of the present invention, image processing component 404 performs the steps for segmenting lung data from image data. Image processing component 404 may be embodied in, for example, a computer program. The results of the segmentation are displayed on display component 406. In an embodiment of the present invention, the steps for segmenting trachea data and lung data from image data are performed by system 400.

In another embodiment of the present invention, system 400 performs the steps of segmenting trachea data and lung data from the image data automatically. System 400 uses established threshold values as described herein to identify lung data and trachea image data. Further, system 400 identifies trachea data and lung image data based on the threshold values. Finally, system 400 performs automatic lung segmentation by segmenting the trachea image data and lung image data based on the identification. Additionally, the segmented lung image data is segmented into left and the right lung data by performing morphological operations, which are performed automatically. Moreover, the segmented left lung data and right lung data are sub-segmented using morphological operations to obtain internal structure data of the lungs. System 400 may or may not need any input from the user. System 400 uses a-priori anatomical information to establish the threshold values. Further, system 400 uses operations such as 'holes filling', 'union', 'difference', 'erosion', 'dilation', 'selection', and the like, as are known. Various embodiments of the invention use one or more of these operations to perform anatomically motivated data extractions as described in more detail herein.

Figure 5:
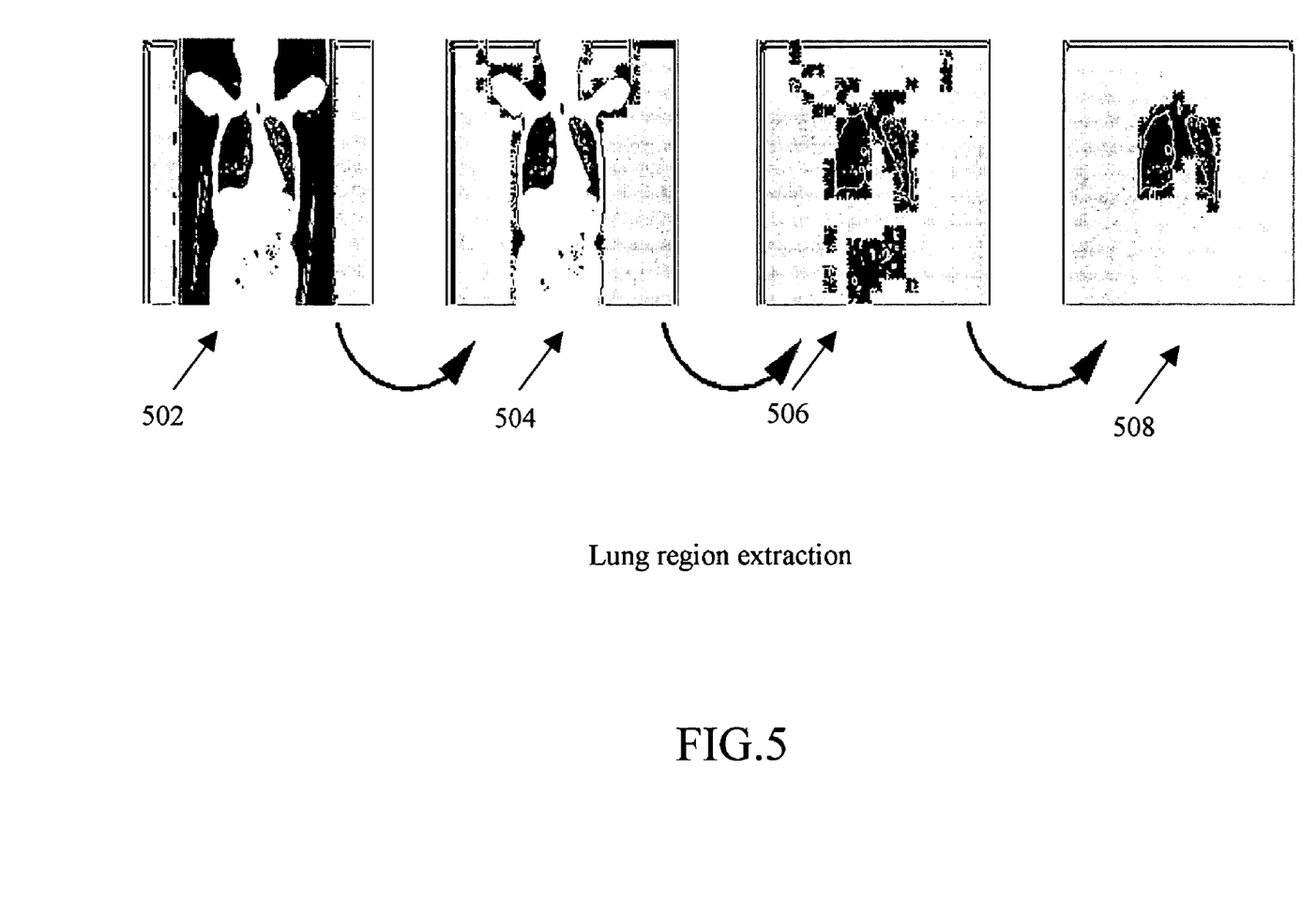
FIG. 5 is a diagram illustrating a stepwise lung region extraction from imaged data in accordance with an embodiment of the present invention.

FIG. 5 is a diagram illustrating a stepwise lung region data extraction from image data in accordance with an embodiment of the present invention. Sub-figure 502 shows the entire image data. The required image data is extracted from sub-figure 502 and is shown in sub-figure 504. By performing morphological operations, certain parts are extracted from the sub-figure 504 and are shown in sub-figure 506. Further, the lung region is extracted from the sub-figure 506 and is shown in sub-figure 508.

Figure 6:
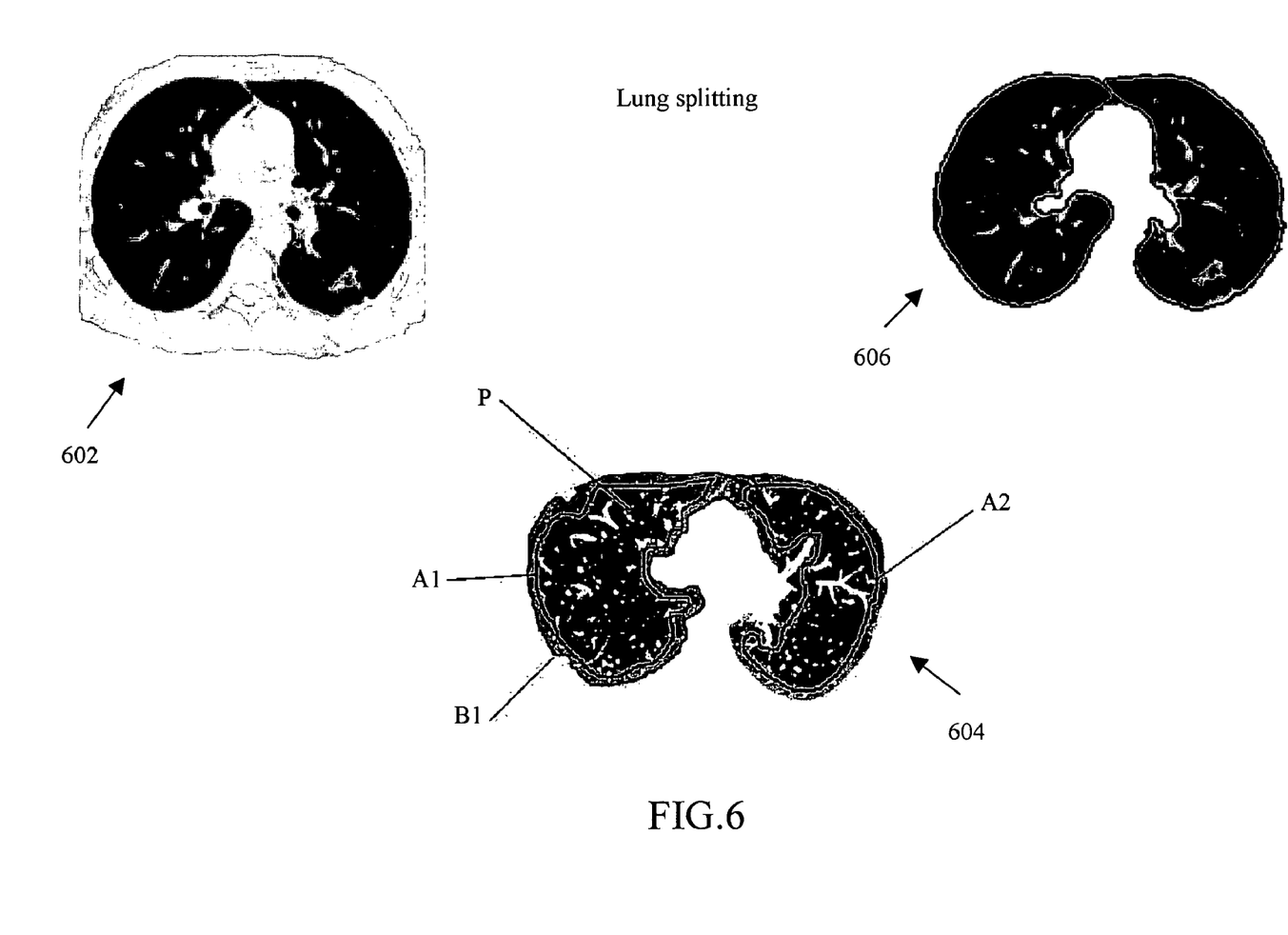
FIG. 6 is a diagram illustrating stepwise lung splitting from the extracted lung region data in accordance with an embodiment of the present invention.

FIG. 6 is a diagram illustrating stepwise lung image splitting from the extracted lung region image in accordance with an embodiment of the present invention. As explained earlier, trachea data removal may not be enough to separate lung data because the lungs are connected through a very thin boundary of slightly brighter voxels and partial voluming at the level of the sternum shown in sub-figure 602. An embodiment of the present invention provides a method by which the boundary region of brighter voxels is determined and then using an adaptive threshold, both lungs are separated. Lung splitting is performed using morphological operations. Sub-figure 604 shows lung splitting with geodesic operations. Geodesic erosion of the parenchyma (P in sub-figure 604) is performed while the lungs are connected. Geodesic erosion of the parenchyma results into left and right eroded parenchyma. The eroded left and right parenchyma are represented in sub-figure 604 by A1 and A2, respectively. The disconnection is obtained at an $n^{th}$ geodesic erosion. It should be noted that the nth geodesic erosion level is the level at which both lungs start to disconnect. A geodesic erosion refers to an erosion that is constrained inside a given shape. In order to ensure that the contact region in both dilated volumes overlap, both eroded lungs are geodesically dilated for (n+10) times. The number (n+10) is based on the average width of the boundary containing brighter voxels. The geodesic dilation results in two dilated volumes B1 and B2 as shown in sub-figure 604. The intersection of these two dilated volumes is the boundary region. The step of geodesic dilation is followed by a sub-step of adaptive thresholding using a threshold defined by the partial volume level on the obtained boundary region. The sub-step of adaptive thresholding includes the removal of boundary bright voxels obtained at the previous step from original threshold lungs volume to obtain left and right parenchyma, which are shown in sub-figure 606.

In an embodiment of the present invention, the steps performed for lung splitting can be similarly performed to disconnect lobes of the lungs and to locate the boundary between the lobes. This results into separated lobes of the lungs.

Figure 7:
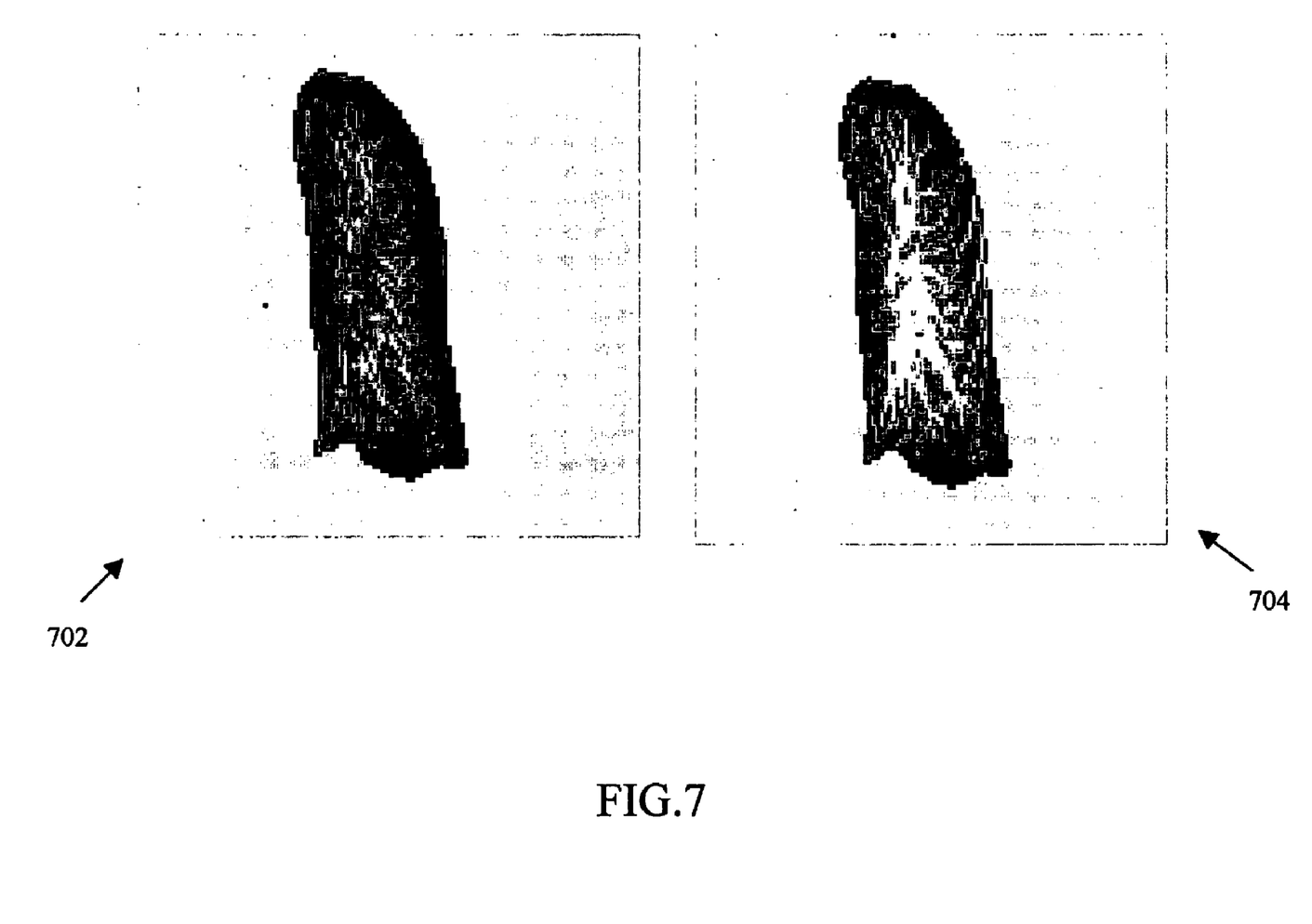
FIG. 7 is a diagram showing images of a segmented lung region before and after bone removal in accordance with an embodiment of the present invention.

FIG. 7 is a diagram showing images of a segmented lung region before and after bone removal in accordance with an embodiment of the present invention. In an embodiment of the present invention, ribs or spine bits can be included in the final lung volume. The ribs or spine bits contribute artifacts for visualization and may need further processing, because in certain cases the lungs are molded against the ribs. This molding shows up as protrusions inside the lung parenchyma. The bone components are removed using threshold values having high densities as described herein. The threshold operation is followed by selection of the largest connected component and a closing to avoid partial volume closing. The bone structure data can then be subtracted from the lung volume to obtain lung region without bones. Sub-figure 702 shows segmentation of lungs without bone removal and sub-figure 704 shows segmentation of lungs with bone removal.

Figure 8:
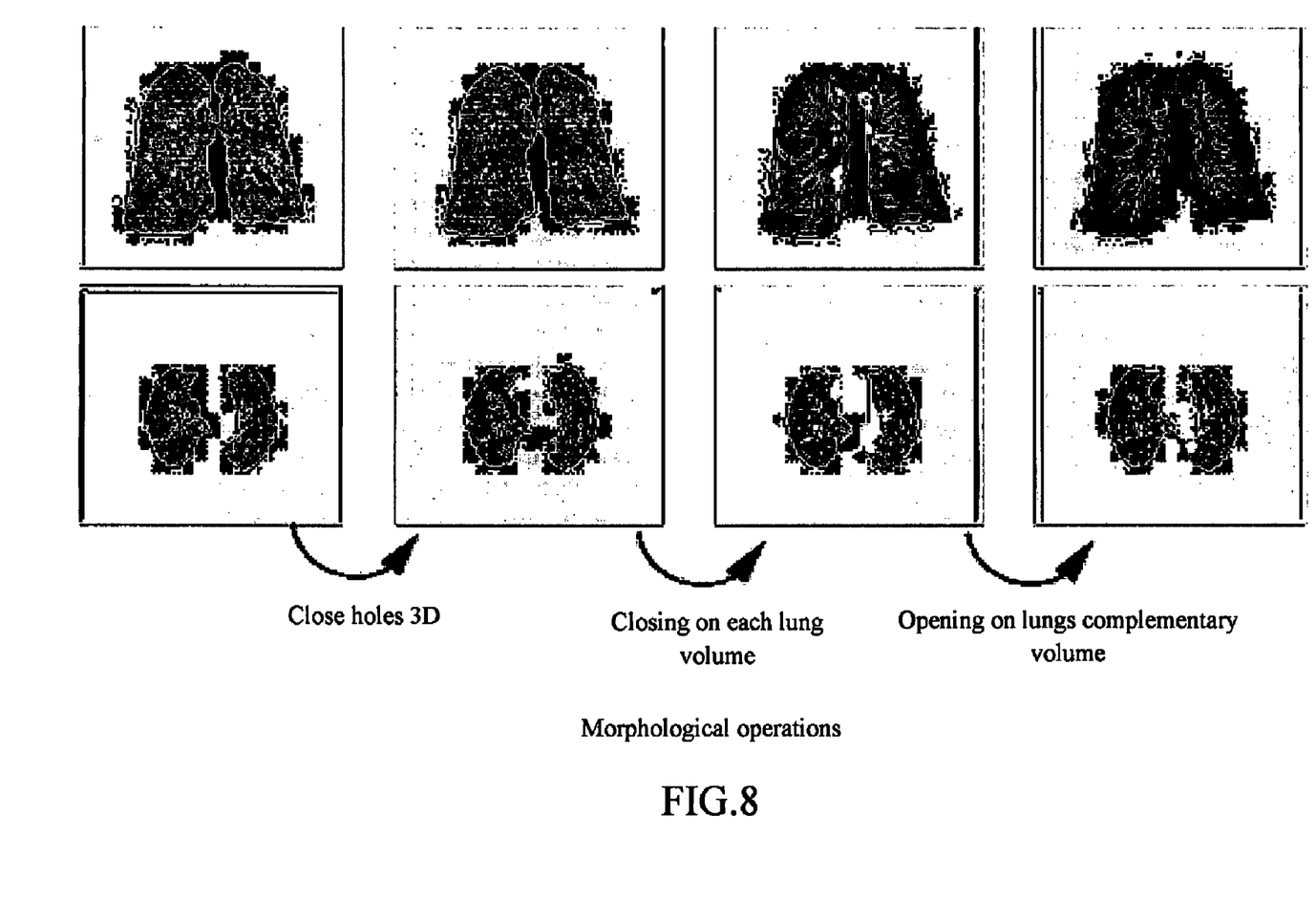
FIG. 8 is a diagram showing images of a lung region during morphological operations to obtain internal structures in accordance with an embodiment of the present invention.

FIG. 8 is a diagram showing images of a lung region processed using morphological operations to obtain internal structures in accordance with an embodiment of the present invention. The morphological operations are performed in order to obtain protrusions without boundary degradation. The morphological operations are performed on both parenchyma volumes and their complementary. As shown in FIG. 8, a morphological closing is performed separately on each parenchyma volume. In an embodiment of the present invention, a structuring element is about 30 mm, which enables identification of most of the important wall protrusions. In order to avoid obtaining non-lung or non-lesion structures, a small opening is also performed on the complementary volume. The step of opening is performed in two-dimensions or three-dimensions depending upon acquisition parameters.

It should be noted that closing and opening are standard morphology operations. A closing is a dilation followed by an erosion with an identical structuring element. This results in closing gaps that are smaller than the structuring element. An opening is the complementary operation that consists of an erosion followed by a dilation. This results in the elimination of protrusions and elements smaller than the structuring element.

Figure 9:
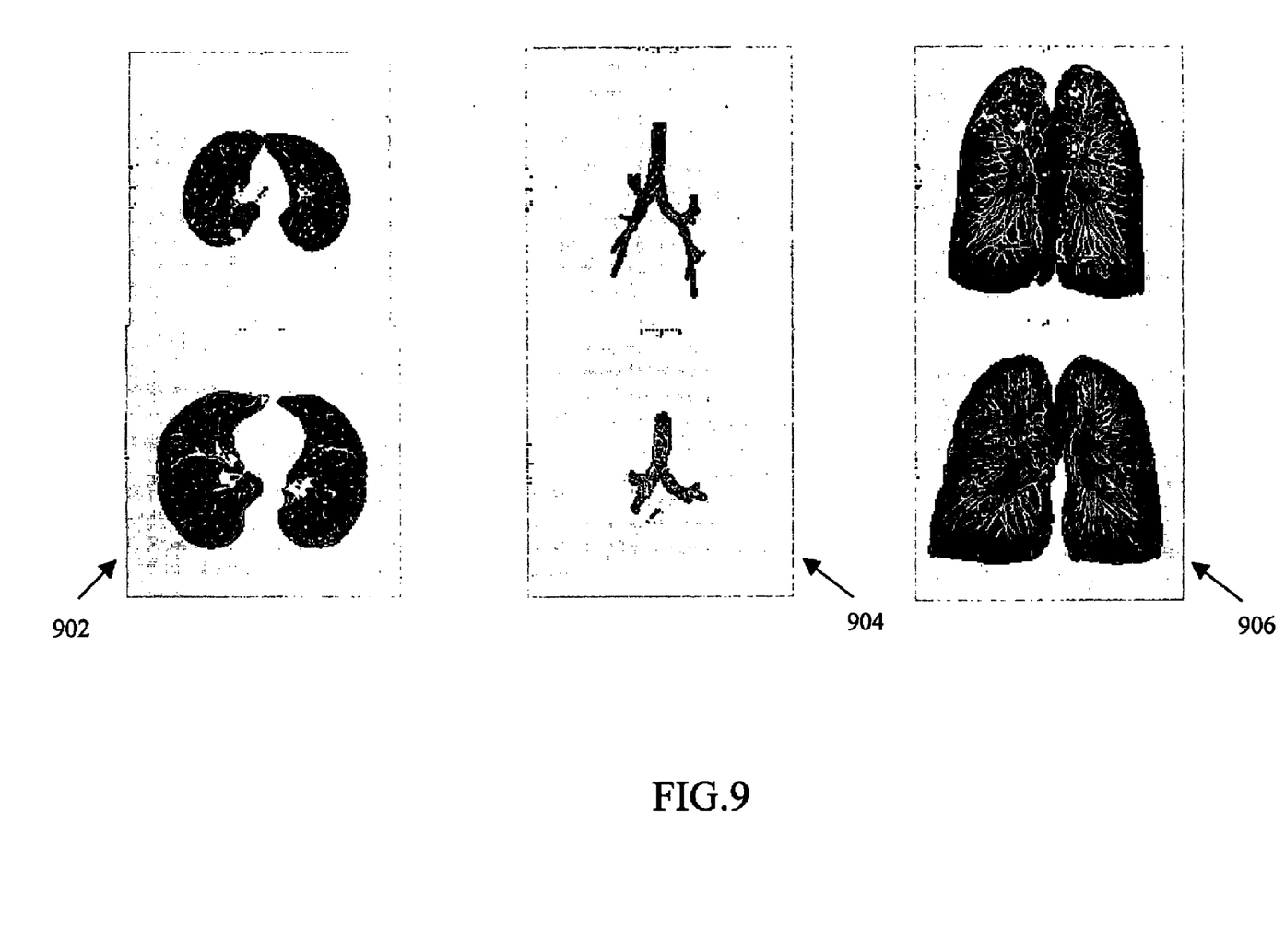
FIG. 9 is a diagram showing exemplary images of a lung and trachea after segmentation in accordance with an embodiment of the present invention.

FIG. 9 is a diagram showing exemplary images of a lung and trachea after segmentation in accordance with an embodiment of the present invention. Sub-figure 902 shows lung segmentation on a cross sectional view. Three dimensional maximum intensity projection views of the trachea are shown in sub-figure 904. Separated lungs on a three-dimensional maximum intensity projection view are shown in sub-figure 906.

The various embodiments of the present invention may be used to perform two major advanced lung analysis-2 (ALA2), which are known as digital contrast agent and auto-registration. Additionally, various embodiments of the present invention provide a medical imaging system to segment trachea data, which enables applications in Chronic Obstructive Pulmonary Disorder (COPD) analysis, such as, emphysema quantification, virtual bronchoscopy, and the like. Finally, various embodiments of the present invention provide a method for lung analysis that is optimized and provides sub-millimetric lung datasets containing, for example, 600 slices in a short time period, for example, ten seconds.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the present invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the present invention has been described in terms of various specific embodiments, those skilled in the art will recognize that the present invention can be practiced with modification within the spirit and scope of the claims.

What is claimed is:

1. A method for processing computed tomography (CT) image data, said method comprising:
   identifying an imaged trachea using model based segmentation; identifying imaged lungs using model based segmentation;
   separating the imaged trachea from the imaged lungs;
   obtaining a boundary region connecting first and second lobes of the images lungs;
   disconnecting the first lobe of the imaged lungs from the second lobe of the imaged lungs using adaptive thresholding using a threshold defined by the partial volume level on the obtained boundary region; and
   displaying at least one of the imaged trachea, the imaged lungs, the first lobe, and the second lobe.

2. A method in accordance with claim 1 further comprising separating a left lung from a right lung of the imaged lungs.

3. A method in accordance with claim 1 further comprising segmenting voxels of the imaged lungs.

4. A method in accordance with claim 1 wherein at least one of said identifying an imaged trachea using model based segmentation and said identifying imaged lungs using model based segmentation is based on a priori information corresponding to at least one of anatomical size information, geometrical relationship information, range information, shape information, volume information and density information.

5. A method in accordance with claim 1 further comprising classifying at least one of the imaged trachea and the imaged lungs.

6. A method in accordance with claim 1 wherein said separating the imaged trachea from the imaged lungs comprises automatically segmenting imaged trachea from the imaged lungs without user inputs.

7. A method in accordance with claim 1 wherein at least one of the imaged lungs, the first lobe, and the second lobe is configured to be used to perform at least one of chronic obstructive pulmonary disorder analysis, fully automated virtual bronchoscopy, and automated emphysema quantification.

8. An imaging system comprising:
   an image acquisition component for acquiring image data;
   an image processing component configured to use model based segmentation and process the acquired image data to generate an image based on the acquired image data, the image processing component further configured to:
      identify an imaged trachea from the acquired image data using model based segmentation;
      identify imaged lungs from the acquired image data using model based segmentation;
      segment the imaged trachea from the imaged lungs;
      obtain a boundary region connecting first and second lobes of the images lungs; and
      disconnect the first lobe of the imaged lungs from the second lobe of the imaged lungs using adaptive thresholding using a threshold defined by the partial volume level on the obtained boundary region.

9. A computer-implemented method for processing image data, said method comprising:
   identifying an imaged trachea from the image data using model based segmentation;
   identifying imaged lungs from the image data using model based segmentation;
   separating the imaged trachea from the imaged lungs;
   obtaining a boundary region connecting first and second lobes of the images lungs;
   disconnecting the first lobe of the imaged lungs from the second lobe of the imaged lungs using adaptive thresholding using a threshold defined by the partial volume level on the obtained boundary region; and
   displaying at least one of the imaged trachea, the imaged lungs, the first lobe, and the second lobe.

* * * * *